(12) United States Patent
Marelas

(10) Patent No.: US 11,663,194 B2
(45) Date of Patent: *May 30, 2023

(54) FINE-GRAINED SHARED MULTI-TENANT DE-DUPLICATION SYSTEM

(71) Applicant: EMC IP Holding Company LLC, Hopkinton, MA (US)

(72) Inventor: Peter Marelas, Melbourne (AU)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/513,326

(22) Filed: Oct. 28, 2021

(65) Prior Publication Data

US 2022/0050821 A1 Feb. 17, 2022

Related U.S. Application Data

(63) Continuation of application No. 16/506,896, filed on Jul. 9, 2019, now Pat. No. 11,200,224, which is a continuation of application No. 14/870,407, filed on Sep. 30, 2015, now Pat. No. 10,380,098.

(51) Int. Cl.
  *G06F 16/23* (2019.01)
  *G06F 16/28* (2019.01)
  *G06F 16/22* (2019.01)
  *G06F 11/14* (2006.01)

(52) U.S. Cl.
  CPC ...... *G06F 16/2365* (2019.01); *G06F 11/1453* (2013.01); *G06F 16/2255* (2019.01); *G06F 16/285* (2019.01)

(58) Field of Classification Search
  CPC ............. G06F 16/2365; G06F 11/1453; G06F 16/2255; G06F 16/285; G06F 11/1456

USPC ......................................................... 707/692
See application file for complete search history.

(56) References Cited

U.S. PATENT DOCUMENTS

| | | |
|---|---|---|
| 8,209,334 B1 | 6/2012 | Doerner |
| 8,775,390 B2 | 7/2014 | Anglin et al. |
| 8,825,971 B1 | 9/2014 | Auchmoody et al. |
| 2011/0055471 A1 | 3/2011 | Thatcher et al. |
| 2011/0099351 A1 | 4/2011 | Condict |
| 2011/0283110 A1 | 11/2011 | Dapkus et al. |
| 2012/0278633 A1 | 11/2012 | Frieder et al. |
| 2014/0013112 A1 | 1/2014 | Cidon et al. |
| 2015/0006957 A1 | 1/2015 | Ginzinger et al. |
| 2015/0127607 A1 | 5/2015 | Savage et al. |
| 2015/0227757 A1 | 8/2015 | Bestler et al. |
| 2015/0324590 A1 | 11/2015 | Krten et al. |
| 2016/0004716 A1 | 1/2016 | Akirav et al. |
| 2016/0054949 A1 | 2/2016 | Obame et al. |

(Continued)

OTHER PUBLICATIONS

U.S. Application filed Sep. 30, 2015, by Peter Marelas, U.S. Appl. No. 14/870,407.

(Continued)

*Primary Examiner* — Michael Pham
(74) *Attorney, Agent, or Firm* — Workman Nydegger

(57) ABSTRACT

In one example, a method includes receiving, at a cloud storage site, chunks that each take the form of a hash of a combination that includes two or more salts and a file object, and one of the salts is a retention salt shared by the chunks, monitoring a time period associated with the retention salt, when the time period has expired, removing the chunks that include the retention salt, and depositing the removed chunks in a deleted items cloud store.

18 Claims, 7 Drawing Sheets

(56) References Cited

U.S. PATENT DOCUMENTS

2016/0086260 A1  3/2016  Vermeulen et al.
2016/0154839 A1  6/2016  Bezawada et al.

OTHER PUBLICATIONS

U.S. Application filed Sep. 30, 2015, by Peter Marelas, U.S. Appl. No. 14/870,565.
US. Appl. filed Sep. 30, 2015, Peter Marelas., U.S. Appl. No. 14/870,565.

FINE-GRAINED SHARED MULTI-TENANT DE-DUPLICATION SYSTEM

RELATED APPLICATIONS

This application is a continuation of, and hereby claims priority to, U.S. patent application Ser. No. 14/870,407, entitled FINE-GRAINED SHARED MULTI-TENANT DE-DUPLICATION SYSTEM, filed Sep. 30, 2015. This application is also is related to U.S. patent application Ser. No. 14/870,565, entitled USER-LEVEL PROCESSES IN A SHARED MULTI-TENANT DE-DUPLICATION SYSTEM, filed Sep. 30, 2015. All of the aforementioned applications are incorporated herein in their respective entireties by this reference.

FIELD OF THE INVENTION

Embodiments of the present invention generally concern data backup and restoration. More particularly, at least some embodiments of the invention relate to systems, hardware, computer-readable media, and methods directed to identification, on a user basis, of user consumption of services, such as deduplication services.

Entities often generate and use data that is important in some way to their operations. This data can include, for example, business data, financial data, and personnel data. If this data were lost or compromised, the entity may realize significant adverse financial and other consequences. Accordingly, many entities have chosen to back up some or all of their data so that in the event of a natural disaster, unauthorized access, or other events, the entity can recover any data that was compromised or lost, and then restore that data to one or more locations, machines, and/or environments.

While data backup is a valuable and important function, the ever increasing volume of data that is generated presents significant problems. In particular, many companies today find their backup and recovery process strained as data growth in enterprise IT environment continues to accelerate at exponential rates, while data-protection solutions have struggled to keep pace. Backup performance is crippled by the needs of up-to-date and online business applications.

In challenging environments such as these, attention has turned to deduplication solutions that can use storage space more efficiently by avoiding the storage of duplicate data. Many deduplication systems are global in scope, in that they identify and eliminate duplicate data across multiple users in a domain. That is, global deduplication systems are shared among multiple users, and are configured and operate to treat all data sets equally. In this way, an enterprise is able to take advantage of commonality among the various user data sets.

However, with the increasing popularity of Information Technology as a Service (ITaaS) models, enterprises are increasingly being asked to attribute the cost of IT services to end users, that is, consumers. To achieve this for global deduplication systems, IT services must offer show back capabilities that attribute consumption of deduplication services to the data of an individual user. The show back capabilities, in turn, enable charge back, that the ability to bill the user based on their indicated use of deduplication services. However, implementation of effective and accurate show back and charge back functions has not been achieved in typical deduplication systems. This is due at least in part to the fact that global deduplication systems and services are not designed to distinguish between different users in this way. Thus, while attempts have been made to adapt global deduplication to provide show back and charge back capabilities, such attempts have been largely unsuccessful.

Nonetheless, the need to be able to attribute deduplication costs to users, and the need to recover those costs, persist. Thus, many enterprises and service providers have resorted to show back models that rely on measuring the pre-compressed capacity consumed by the user objects. These metrics are recorded in the file system namespace which can be processed quickly and efficiently. While this approach is relatively easy to implement and administer, it is unable to quantify the effectiveness of the deduplication system relative to the objects of an individual user. Rather, all users are treated equally with respect to the effectiveness, or lack thereof, of the data reduction techniques. That is, the value provided by the deduplication system to any given user cannot be readily determined. Thus, while the value provided by the deduplication system can vary from one user to another user, all the users are treated as having received the same value. One result of this is that users who receive relatively less value effectively subsidize the users to whom relatively more value is provided.

As well, at least some deduplication systems are vulnerable to exploitation by users. For example, many users recognize that by pre-compressing data before sending the data to the deduplication system, they are able to reduce the amount of logical capacity consumed, which substantially reduces the users show back measure and, accordingly, the cost charged to the user. For the IT service provider, this is detrimental to the economics of the deduplication system and the show back cost model, which assumes an average level of deduplication for each of a plurality of users.

In light of problems and shortcomings such as those noted above, it would be useful to be able to measure, on a user basis, backend storage consumption for objects quickly and efficiently for a large number of users and for any low-end or high-end deduplication system. Correspondingly, it would be useful to be able to accurately attribute and bill, on a user basis, consumption of deduplication services. As well, it would be useful to be able to implement a deduplication system that is not easily exploited by users.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
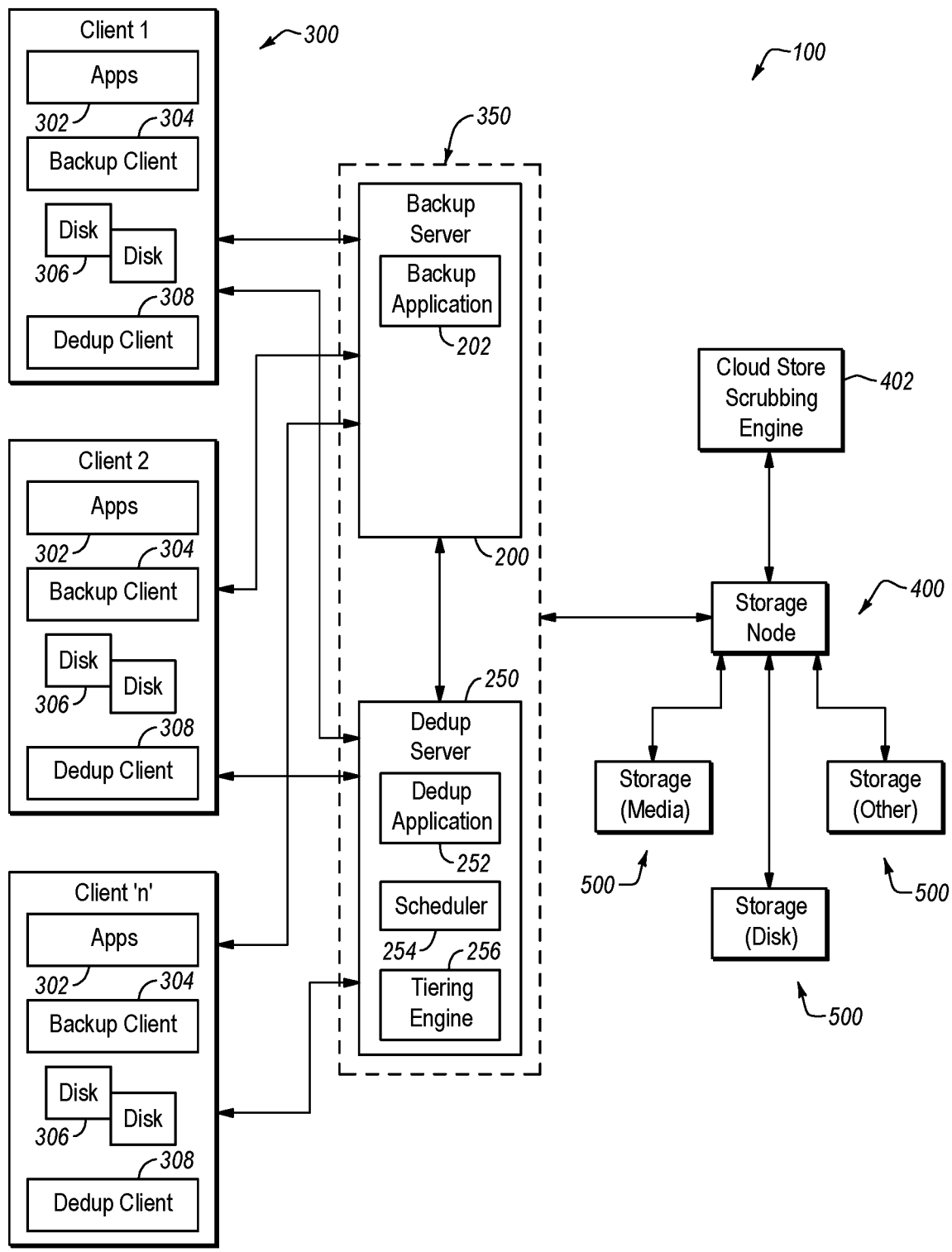
FIG. 1 is directed to aspects of various example operating environments for at least some embodiments.

At least some embodiments of the invention relate to systems, hardware, computer-readable media, and methods directed to identification, on a user basis, of user consumption of services, such as deduplication services in which user data may be deduplicated before, or after, being backed up. The deduplicated backup data can later be retrieved and restored to one or more targets.

It should be understood that the term 'backup,' as used herein, is intended to be broadly construed and is not limited to any particular type or form of backup. Thus, backup, as contemplated by this disclosure, embraces, but is not limited to, full backups, snapshots, replication, incremental backups, de-duplicated backups, and any other circumstance or process where data that is desired to be protected is copied to one or more backup resources for protection.

In at least some implementations, user level content salting is employed in which each user is assigned a unique system-wide marker, which may be referred to herein as a salt, that persists as long as the user exists in the system. Each time that user connects to the system, the salt assigned to that user is obtained and the salt is then associated with any data generated by that user. Data generated by, or at the direction of, a user may be referred to herein as taking the form of chunks of data. However, it should be understood that the scope of the invention is not limited to any particular type, combination or size of data.

With regard to one particular embodiment, data generated by the user are appended, or prepended, as the case may be, with the salt that has been assigned to that user. Once the salt has been associated with the user data, the combination of the user data and the salt is used to generate a hash. Because this hash includes the user specific salt, the hash of the data+salt combination is also specific to that user. The salt can then be recorded both against the namespace of the user object that includes the data that was hashed, and against the hash itself.

In operation, any common chunk or other piece of user data that is generated in a subsequent stream by the same user will compute the same hash with the same content salt. Thus, duplicate data can be readily identified by comparing a new hash with existing hashes for the same user and, where the new and existing hashes match, the data that served as the basis for the new hash can be eliminated. Because deduplication is performed at the user level in the deduplication environment or domain, it is possible, for example, that two different users may store identical blocks of data, although the content salts of the respective users ensures that the two identical blocks will not share the same persistent storage address space.

Advantageously then, embodiments of the invention provide the ability to perform user-specific deduplication in a deduplication environment. That is, embodiments of the invention enable the creation of user-level deduplication domains within a deduplication environment that is shared by multiple users. As well, this deduplication can be performed at any desired granularity, one example of which is the user object level. Moreover, the deduplication can be performed locally at the user, so that duplicates are eliminated before the data is transferred across a cloud connection for backup. Finally, in some embodiments, a hybrid approach can be employed in which both user-level deduplication and global deduplication can be performed in the same deduplication environment. The user-level deduplication can be directed to one type or set of user data, while the global deduplication can be directed to a second type or set of user data.

A. Example Operating Environments

In general, embodiments of the invention may include and/or be implemented in an operating environment that includes one or more clients that include data that is desired to be protected in some way. The clients can communicate with a backup server and may include one or more applications which generate, and/or cause the generation of, data which is desired to be backed up for later restoration to the client and/or one or more other target machines. The clients and the target machines can be physical machines or virtual machines (VM), though neither type of machine is required for any embodiment. As used herein, the term 'data' is intended to be broad in scope and embraces, by way of example and not limitation, data chunks, data blocks, atomic data, emails, objects of any type, files, contacts, directories, volumes, and any group of one or more of the foregoing.

With the foregoing in mind, attention is directed now to FIG. 1 which discloses one example of an operating environment that may be suitable for one or more embodiments of the invention. In FIG. 1, the example operating environment is denoted at 100 and may be a network such as a local area network, a wide area network, or any other networked configuration. Moreover, the operating environment 100, or any group of one or more of its elements, may comprise, form an element of, or constitute, a cloud computing environment. The operating environment 100 may include various devices including servers and other computing devices that are interconnected. The operating environment 100 may employ a variety of communication media, such as hardwire, wireless, or some combination thereof. In some instances, some or all of the operating environment 100 may comprise an optical communication network.

As indicated in FIG. 1, the example operating environment 100 includes a backup server 200 configured for communication with a deduplication server 250, one or more clients 300, and a storage node 400 that may comprise an element of a cloud computing environment. The deduplication server 250 and backup server 200 may collectively define a deduplication environment 350 although, as noted herein, the deduplication environment 350 can take other forms as well. The deduplication environment 350 may reside at the same physical premises as one or more of the clients 300, although that is not required. It should be noted that, more generally, the deduplication environment refers to any environment in which deduplication is performed and, as such, the scope of the invention is not limited to the example of FIG. 1.

In some embodiments, the respective functionalities of the deduplication server 250 and backup server 200 may be combined in a single server. In yet other environments, the deduplication server 250 is omitted and respective instances of a deduplication application 252 reside on one or more of the clients 300, each of which communicates with the backup server 200. In this example, the deduplication environment 350 comprises the group of clients 300 on which the deduplication application 252 resides. The deduplication server 250 may further include a scheduler 254 and a tiering engine 256.

The storage node 400, which may be a cloud storage node, can communicate with, or include, various types of storage 500, and the storage node 400 may include or be associated with a cloud store scrubbing engine 402. In general, backups of one or more of the clients 300 can be made by cooperation between the backup server 200 and the client 300, and the backups can then be stored by the backup server 200 at the storage node 400. Subsequently, one or more of the stored backups can be restored to one or more of the clients 300 and/or any other target(s). The backup server 200, deduplication server 250, clients 300, storage node 400 and/or target(s) may be physical machines, virtual machines (VM), containerized machines, or any other suitable type of device. As well, some or all of the storage 500 can be implemented as physical or virtual devices. Finally, while not specifically illustrated, the storage node 400 can include one or more database servers that communicate with one or more data stores. The database servers can store metadata, such as pointers for example, that point to data stored in the data store(s).

In one alternative to the arrangement of FIG. 1, the storage node 400 can be replaced with, or constitute, a primary storage device that communicates with the backup server 200. The primary storage device, in turn, may communicate with a data domain, which may incorporate the EMC Corp. DataDomain backup technology, that includes one or more storage devices where backups can be retrievably stored. The storage devices of the data domain can include, for example, an onsite retention storage device or array, and also an offsite disaster recovery (DR) storage device or array.

With particular reference first to the backup server 200, some embodiments may employ a backup server 200 in the form of an EMC Avamar server or NetWorker server, although the scope of the invention is not limited to those example servers. The backup server 200 includes a backup application 202 that participates in the generation of backups. Example implementations of the backup application 202 are discussed in more detail below.

One or more of the nodes, such as client 300, with which the backup server 200 communicates can take the form of a server. It is not required that the server be any particular type of server. One or more of the client(s) 300 include any of various applications 302 that generate data that is desired to be protected. As well, the client(s) 300 can each include a respective instance of a backup client 304 that generally operates in cooperation with the backup application 202 of the backup server 200 to create one or more backups that include data that is resident on storage media 306, such as disks for example, of the client 300. The backups thus created can be communicated to the storage node 400 for storage and subsequent retrieval.

Example embodiments can be employed in a variety of different devices and applications, examples of which the following EMC products related to backup and deduplication devices, namely, EMC Data Domain, EMC Avamar, and EMC CloudBoost. However, the scope of the invention is not limited to backup devices and, accordingly, yet other embodiments can be employed in storage devices such as EMC XtremIO, EMC VNX, EMC VMAX, EMC Isilon, EMC Atmos, and EMC Elastic Cloud Storage. Finally, embodiments of the invention can be applied to any storage medium, examples of which include, but are not limited to, memory, flash, hard disk and tape.

B. Example Deduplication Domain

With continued reference to the example operating environment of FIG. 1, the deduplication environment 350 may, as noted earlier, include the backup server 200 and deduplication server 250. In general, the deduplication environment 350 is configured to communicate with a cloud storage environment which includes, or may consist of, the storage node 400. As such, deduplicated backups, which may be user-specific deduplicated backups, can be communicated by the deduplication environment 350 to the storage node 400.

In general, the deduplication server 250 includes a deduplication application 252 that cooperates with respective deduplication clients 308 on one or more of the clients 300 to perform deduplication services with respect to client 300 data that is to be backed up. Creation of the backup and deduplication can be performed in any order. Thus, creation of the backup may be performed before, after, or at substantially the same time as, deduplication of the data that is to be backed up.

Thus, in some embodiments, deduplication is cooperatively performed by the deduplication application 252 and the deduplication clients 308 after data has been identified for backup. Once deduplication has been completed, the backup application 202 can then cooperate with the backup clients 304 to create a backup of the deduplicated data. The deduplicated backup(s) can then be communicated to the storage node 400.

In one alternative embodiment, the backup may first be created by cooperation of the backup application 202 and backup clients 304 and, subsequently, deduplication can be performed on that backup by cooperation of the deduplication application 252 and deduplication clients 308. The deduplicated backup(s) can then be communicated to the storage node 400.

C. Example Host Configuration

Figure 2:
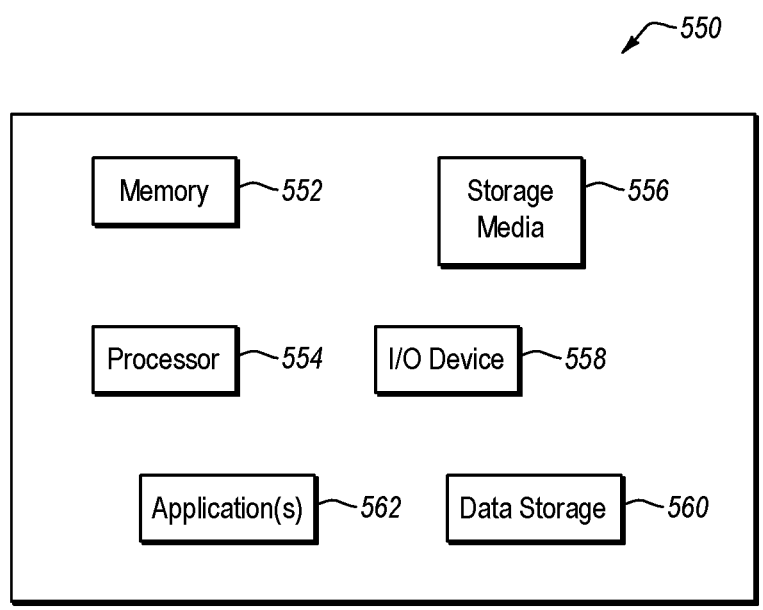
FIG. 2 discloses aspects of an example host configuration.

With reference briefly to FIG. 2, one or more of the backup server 200, deduplication server 250, clients 300, or storage node 400 can take the form of a physical computing device, one example of which is denoted at 550. In the example of FIG. 2, the computing device 550 includes a memory 552, one or more hardware processors 554, non-transitory storage media 556, I/O device 558, and data storage 560. As well, one or more applications 562 are provided that comprise executable instructions. Such executable instructions can take the form, for example, of one or more of a backup application, a backup client, or a deduplication application.

D. Salted Content and Some Associated Processes

Figure 3:
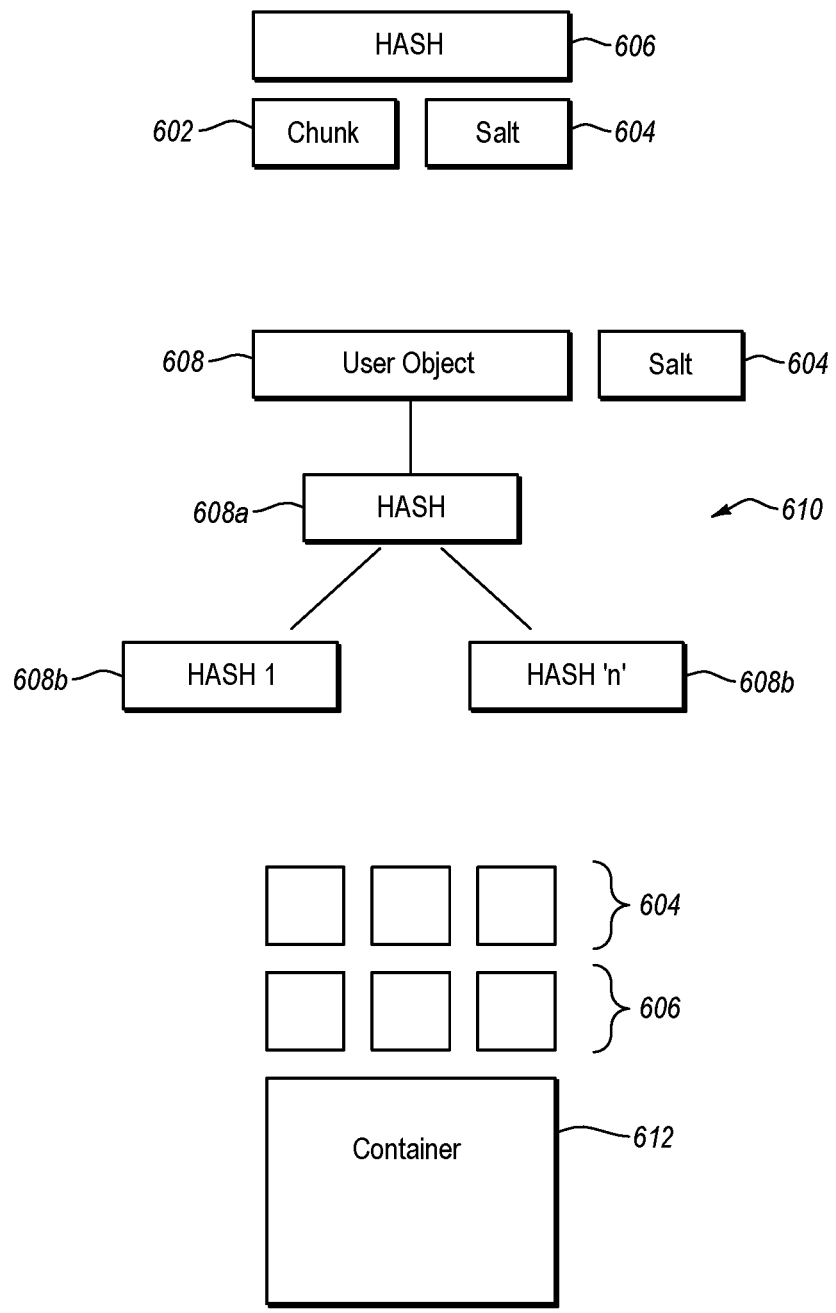
FIG. 3 is directed to examples of salted content and some associated processes.

With reference now to FIG. 3, details are provided concerning some examples of salted content and associated processes. In general, any data can be salted and the scope of the invention is not limited to the salting of any particular data. As noted herein, the data that is salted can be associated with a particular user and may have been generated in connection with the operation of one or more applications, such as the applications 302 noted in FIG. 1, although that is not necessarily required. FIG. 3 illustrates a simple example where a chunk 602 of user content is associated with a salt 604 that is based upon the identity of the user in connection with whose stream the chunk 602 of user data was generated. Generally, the salt 604 can be based on any piece of information, or combination of pieces of information, that uniquely identify a particular user. Thus, in one example, the salt 604 could be derived from, or otherwise based upon, a username-password combination. As a result, the salt 604 is, by its nature, unique and specific to a particular user. The salt can take the form of one or more chunks or blocks of data.

In any event, once the user-specific salt 604 has been generated, data such as the chunk 602 can then be associated with the salt 604. In some particular embodiments, the chunk 602 is appended, or prepended, with the salt 604. A hash 606 can then be generated of the chunk 602+salt 604 combination. The hash 606 can be generated by any suitable hashing program, hash function or algorithm. One example of a hash function that can be employed in some embodiments is a cryptographic hash function.

In general, the salt 604 may, in addition to being associated with each chunk 602 or other piece of data, be associated with other user-specific elements as well. For example, the salt 604 may, in some embodiments, also be recorded against the namespace associated with the user object that includes the chunk 602. In the particular example of FIG. 3, the salt 604 is associated with the user object 608 that includes the chunk(s) 602. As further indicated, after the salt 604 is associated with the user object 608, a hash tree 610, such as a Merkle tree, of the contents of the user object 608 can be built. In general, the hash tree 610, shown in simplified form, represents user object 608 contents broken into a list of data blocks of variable size. Because the user object 608 has been salted, the hash tree 610 is likewise unique to the user object 608. In the illustrated example, each of the hashes 608b is a hash of a data block, or group of data blocks, of the user object 608, and the hash 608a is a hash of the concatenation of the hashes 608b. This same salting and hashing methodology can be applied to multiple objects so that a collection of file objects salted using the same salt constitutes, more generally, a collection of related objects that may be used for a variety of purposes or processes, such as enabling data isolation, and providing the ability to move all the blocks together, or otherwise handle a group of blocks in the same way.

One advantage of storing the salt 604 in association with the user object 608 is that the effects of the salt 604 on the chunks 602 can later be reversed, if desired. For example, this could be accomplished by removing, or otherwise dissociating, the salt 604 from the chunks 602 that are referenced by the user object 608, and then performing a hash of only the chunks 602. The resulting hash would not be associated with a particular user because the salt 604 was removed prior to hashing of the user object 608.

Finally, the chunks 602 of a particular user object 608 may all be stored in a common container 612. In some embodiments, the container 612 is a contiguous space of storage having a size of about 4.5 MB, although other types and sizes of containers can alternatively be used. As noted earlier, each of the chunks 602 can be appended or prepended with a salt 604, and the combination of the chunk 602+salt 604 then hashed to produce a hash 606. Each of the hashes 606 can be associated with the container 612 that includes the chunks 602 from which the hashes 606 were respectively derived, as shown in FIG. 3. In turn, the salt 604 can also be associated with each different hash 606 that is created.

As will be appreciated from the present disclosure, including the discussion of FIGS. 1 and 3 above, the use of user-derived content salt enables the creation of user-level deduplication domains within a shared deduplication system. Moreover, the deduplication can be performed at a relatively fine level of granularity, such as at an object level for example. Other useful functionality provided by content salting includes the ability to determine the amount of backend storage capacity consumed by the objects associated with a user. As a result, show back and charge back operations can be performed with a relatively high degree of accuracy and confidence in terms of establishing the extent to which each user in a domain has consumed deduplication services.

With continued attention to FIGS. 1 and 3, and the corresponding discussion, further details are provided concerning some aspects of content salting and associated processes. As noted above, one useful aspect of content salting is that it enables the determination of backend storage consumption by individual users. This determination can be made in a variety of different ways.

For example, the amount of backend storage capacity consumed by the objects of a particular user can be determined by keeping a running total of the chunk sizes with which the user salt is associated. The running total can be maintained in real time and can account for both ingestion, or intake, of user data chunks and during physical garbage collection, or removal/deletion of user data chunks. In this way, a net total of user data chunks associated with the user salt is maintained on-the-fly. In at least some embodiments, the mechanism for maintaining the running total is a salt dependent counter. The salt dependent counter is incremented for each incoming or ingested user chunk associated with the user salt, and the salt dependent counter is decremented for each user chunk associated with the user salt that is deleted or otherwise handled such that it no longer consumes backend storage.

Another example of a way to determine the amount of backend storage capacity consumed by the objects of a particular user involves the use of the user object namespace. In particular, objects associated with a particular salt can be identified by traversing the object namespace. The size of the live data chunks in the object namespace can be totaled, thus giving the amount of storage capacity consumed by live objects associated with a particular user. Because the data chunks identified are unique to the salted object(s) of the user, it is unnecessary to 'rehydrate' the user object, that is, restore the user object from the hashes, and recompute the unique set of hashes for the working set of data chunks whose associated storage consumption is being measured.

As a final example of a way to determine the amount of backend storage capacity consumed by the objects of a particular user, the physical data chunks can be traversed. In this approach, the physical data chunks associated with one or more salted user objects are traversed and the sizes of the live physical data chunks are totaled to determine the amount of backend storage space consumed by the associated user. As in the preceding example, the identified data chunks are unique to the salted object(s) of the user. Consequently, it is unnecessary to 'rehydrate' the user object and recompute the unique set of hashes for the working set of data chunks whose associated storage consumption is being measured.

As evidenced by the discussion of FIGS. 1 and 3, for example, embodiments of the invention enable, among other things, accurate and fine-grained user-level backend storage capacity consumption. While user-level deduplication, rather than global deduplication, is employed in at least some of the disclosed example deduplication environments, various benefits provided by the deduplication environment are nonetheless preserved. By way of illustration, various deduplication infrastructure resources can be shared among the users. These resources may include, for example, one or more CPUs, I/O performance, memory, networking functionality, and the datacenter footprint.

E. User-Level Data Isolation

The ability of embodiments of the invention to accurately identify, at a fine-grained level, the amount of backend storage consumed by the data of a user provides a variety of related benefits. For example, in addition to enabling accurate show back and charge back operations, embodiments of the invention also provide for user-level data isolation in the context of a deduplication system or environment that is shared by multiple users. Among other things, this functionality ensures that notwithstanding that two different users in a shared deduplication domain may store identical blocks of data, the use of content salts for each of the respective users ensures that the two identical blocks will not share the same persistent storage address space.

Figure 4:
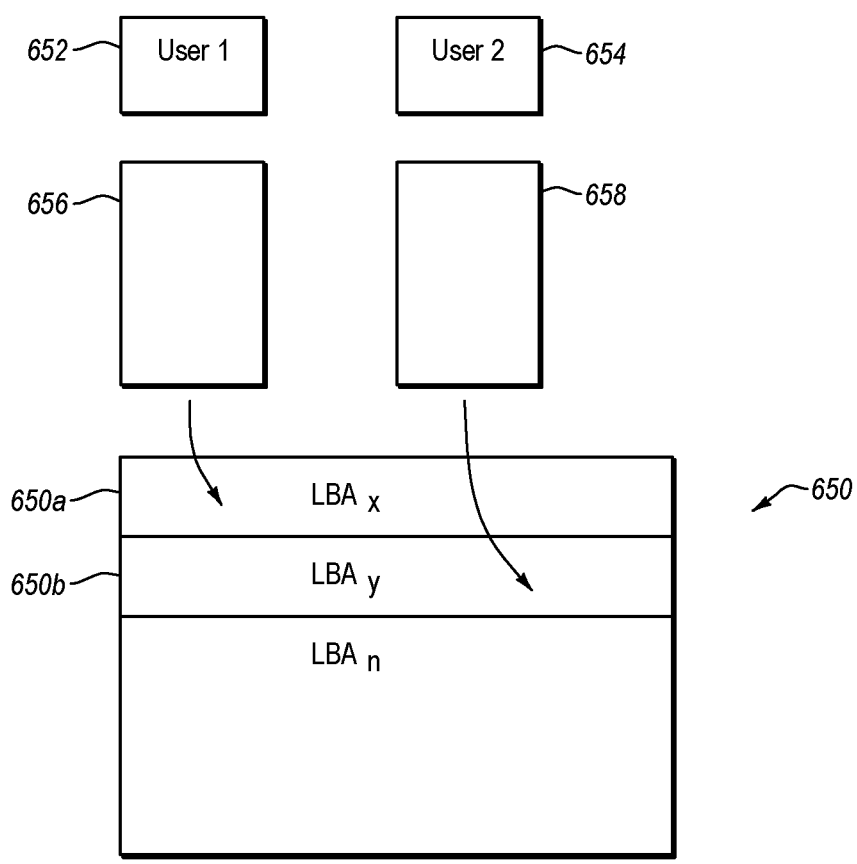
FIG. 4 discloses aspects of a process and configuration for user-level data isolation.

With reference now to FIG. 4, details are provided concerning user-level data isolation. As shown there, a container 650 is provided that includes a plurality 'n' of different logical block addresses (LBA), such as LBAx, LBAy, and LBAn. Because it is possible that users within a shared deduplication environment may store one or more identical data blocks, those identical data blocks must be stored at different respective LBAs within the container 650 in order to ensure that the data of each user is isolated from the data of other users in the same shared deduplication environment.

In more detail, and with reference to the illustrated example, a first salt, User1 salt 652, is associated with a first user, and a second salt, User2 salt 654, is associated with a second user. Each of the salts Used salt 652 and User2 salt 654 is used to salt respective content 656 and 658 of the first user and the second user. The salted content 656 and 658 is then stored, respectively, at logical block addresses 650a and 650b of the container 650, specifically, LBAx and LBAy of the container 650.

In this example, the content 656 and 658, which may each be in the form of a block or group of blocks for example, are identical to each other. However, each of the content 656 and 658 is salted with a respective user specific salt, namely, Used salt 652 and User2 salt 654. Thus, the use of salts such as User1 salt 652 and User2 salt 654 provides a way to uniquely identify, and store in a common container, multiple sets or collections of content which would otherwise be indistinguishable from each other. When the stored data of a user is to be retrieved and restored to a target, or targets, the data specific to that user can be readily identified by reference to the user-specific LBAs at which the user data is stored.

F. User-Level Data Encryption

A further benefit of embodiments of the invention concerns encryption of user data. In particular, embodiments of the invention enable encryption of data on a user basis. Thus, a circumstance where data of a first user is desired to be encrypted, but data of a second user is not to be encrypted, can be readily accommodated, even where the data of both users is being processed in a common deduplication environment or domain. In general, user-level encryption of data in a deduplication environment can be effected by associating a user-specific salt with a system-wide encryption key. In this way, encrypted user data can be associated generally with the deduplication environment, and specifically with the user in the context of that deduplication environment.

Figure 5:
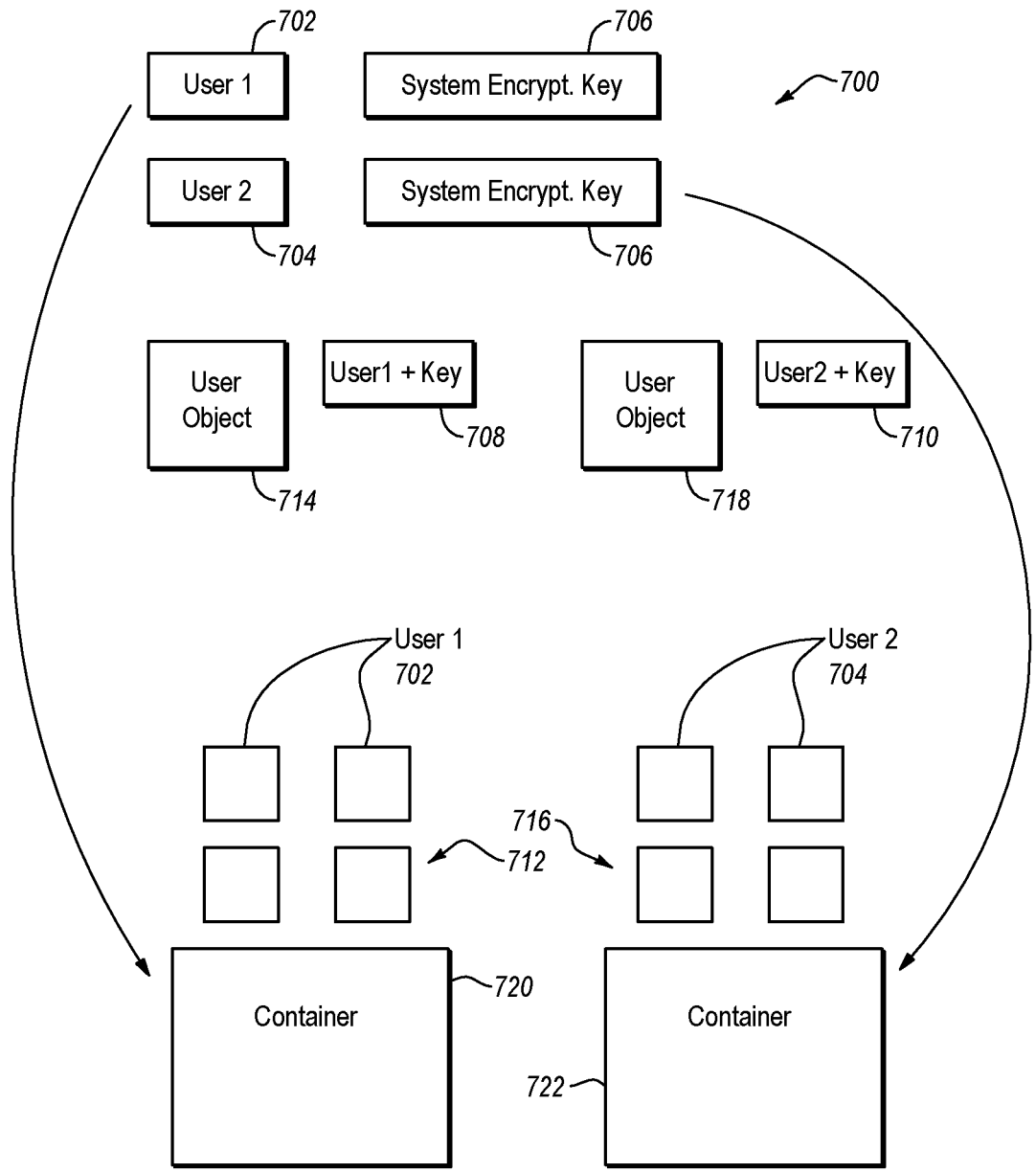
FIG. 5 discloses aspects of a process and configuration for user-level data encryption.

In more detail, and with reference now to FIG. 5, aspects of an example scheme for implementing user-level data encryption for multiple users in a shared deduplication environment 700 are disclosed. As indicated there, multiple user salts, User1 702 and User2 704 for example, can each appended, or prepended, to a common, or system-wide, encryption key 706. The encryption key 706 may be unique to the shared deduplication environment 700. Moreover, because the salts User1 702 and User2 704 are each user-specific, the encryption key 706+user-level salt combinations 708 and 710 are likewise user-specific and can be used to encrypt blocks 712 of a user object 714, and blocks 716 of a user object 718. The encrypted blocks 712 and 716 can then be stored in respective containers 720 and 722 for later retrieval and decryption.

G. Further Bases and Uses for Content Salting

As noted herein, various embodiments of the invention provide for salting content on a user basis. However, the scope of the invention is not limited to salting of content on a user basis. More generally, content can be salted on one or more additional, or alternative, bases. Accordingly, the scope of the invention should not be construed to be limited to the salting of content on any particular basis, or combination of bases.

Details are now provided concerning configurations and processes that involve the salting of content on a user-specific and/or other base(s). More particularly, content salting can be implemented in deduplication domains that are targeted for tiering to cloud storage, which may also be referred to herein as 'the cloud.' Among other things, this approach enables the tiering of objects to cloud storage while preserving deduplication semantics in the cloud storage.

It should be noted that as used herein, the term 'tiering' embraces any process, or group of processes, that establish relative priorities or classifications as among groups of data and/or that cause the storage of such data according to those priorities or classifications. Such priorities and classifications can be used, for example, to determine wherein, in a cloud storage system for example, particular data will be stored. As another example, such priorities or classifications can be used to determine, as between primary storage (such as local storage) and secondary storage (such as cloud storage), where and/or how particular data will be stored.

Salting an object by a property, or properties, such as the retention period noted above, may provide a variety of benefits. For example, this type of salting may enable the preservation of locality for the set of objects in preparation for tiering those objects to a cloud store, such as, for example, the Amazon Simple Storage Service (S3), Amazon Glacier, OpenStack Swift, Microsoft Azure Storage, Google Cloud Storage, EMC Atmos, or EMC Elastic Cloud Storage.

In more detail, data comes into the storage system, such as the storage node 400 for example, via a stream or connection. As noted herein, the incoming stream of data is associated, by the storage system for example, with a user-specific salt and all of the data that comes into the storage system as part of this stream is salted with the user-specific salt and stored in a container that is specific to that data stream. That is, that particular container can only store data from the data stream that created it. Once the data stream fills up a container, a new container is created and the process continues. In the event that a second data stream comes in at the same time as the first data stream, a new container for the second data stream is created and this second stream of data enters the new container with an associated salt that is specific to the second data stream.

As is apparent from the foregoing, data locality is preserved because the data associated with the same stream and salt is stored in the same container, or set of containers. That is to say, data from different streams and with different salts is not co-mingled in the same containers. Put another way, each container is specific to, and contains data from, only one data stream and not from any other data streams.

In the case where there is a need to take existing salted data in containers and re-salt that data with a new property, such as the retention property discussed above for example, the system applies the same approach with respect to storage of the re-salted data into containers. That is, the re-salted data is written to new containers and data locality is thus preserved.

Moreover, data can be tiered to cloud storage in various sizes and types of units. In some embodiments, the unit tiered to the cloud is a container, which may be partly or completely full. Thus, since all data stored in containers shares the same properties, one or more of which are representative of a salt, data locality is preserved regardless of where the data is stored, in the storage system or having been tiered to the cloud object storage.

As noted herein, salting an object, whether by user and/or by one or more properties, can provide a variety of benefits. Yet other benefits attending the use of salted content relate to the tiering of salted content to cloud storage.

By way of example, tiering in the cloud using content salted deduplication domains enables objects to live or die in cloud object stores as an atomic unit. This avoids resorting to copy-forward garbage collection, consolidation or recycling of cloud objects. These approaches are not effective for cloud targets, which are intentionally priced to penalize recalls to maintain cloud lock-in.

In more detail, and with reference to the context of backup and data protection systems, every piece of data that is written to the storage has an implied expiration period. This is the period in which the data should be retained in the storage system before it is no longer required and can be deleted, and the vacated space reclaimed for use.

There are cases where it is useful to tier certain data sets to a more cost effective storage platform, such as a public cloud object store for example. This approach may be employed where it is desired to retain the data for a long period of time, which may be measured in years in some cases. In order to tier data to object stores, it is often desirable to pack pieces of data together into large contiguous objects for greatest efficiency. One drawback of this process however is that it results in co-mingling data into the same object.

In particular, the problem with co-mingling data is that different pieces of the data in an object will be related to different data sets with different expiration periods. Therefore, when data sets expiration periods elapse and the data can be deleted, it is necessary to read back the objects that this data was spread across in order to separate the pieces of data that have not expired from the pieces of data that have expired. Then, new objects must be written in the cloud object store with only the data that has not expired, and the objects that contained the co-mingled data must then be deleted. This process is sometimes referred to as copy-forward garbage collection, in that live data is copied to new objects in order to delete and reclaim space from old objects that had the co-mingled live data and dead data. Because copy-forward garbage collection involves reading back and re-writing data in order to reclaim space from cloud object stores, it is not cost-effective due to the revenue model employed by public cloud providers, which charges the user for the amount of data retrieved, that is, downloaded.

In this regard, embodiments of the invention are advantageous insofar as they eliminate the need for processes, such as copy-forward garbage collection, that require users to read back data from storage in order to reclaim space. In particular, by applying a unique salt to data that shares the same expiration period, co-mingling of data is avoided. All pieces of data that share the same salt end up in the same container and it is these containers, which contain pieces of data, that are tiered to the cloud object store. Once the expiration period elapses for the given salted data, the entire object in the cloud can be deleted and copy-forward garbage collection is avoided.

Figure 6:
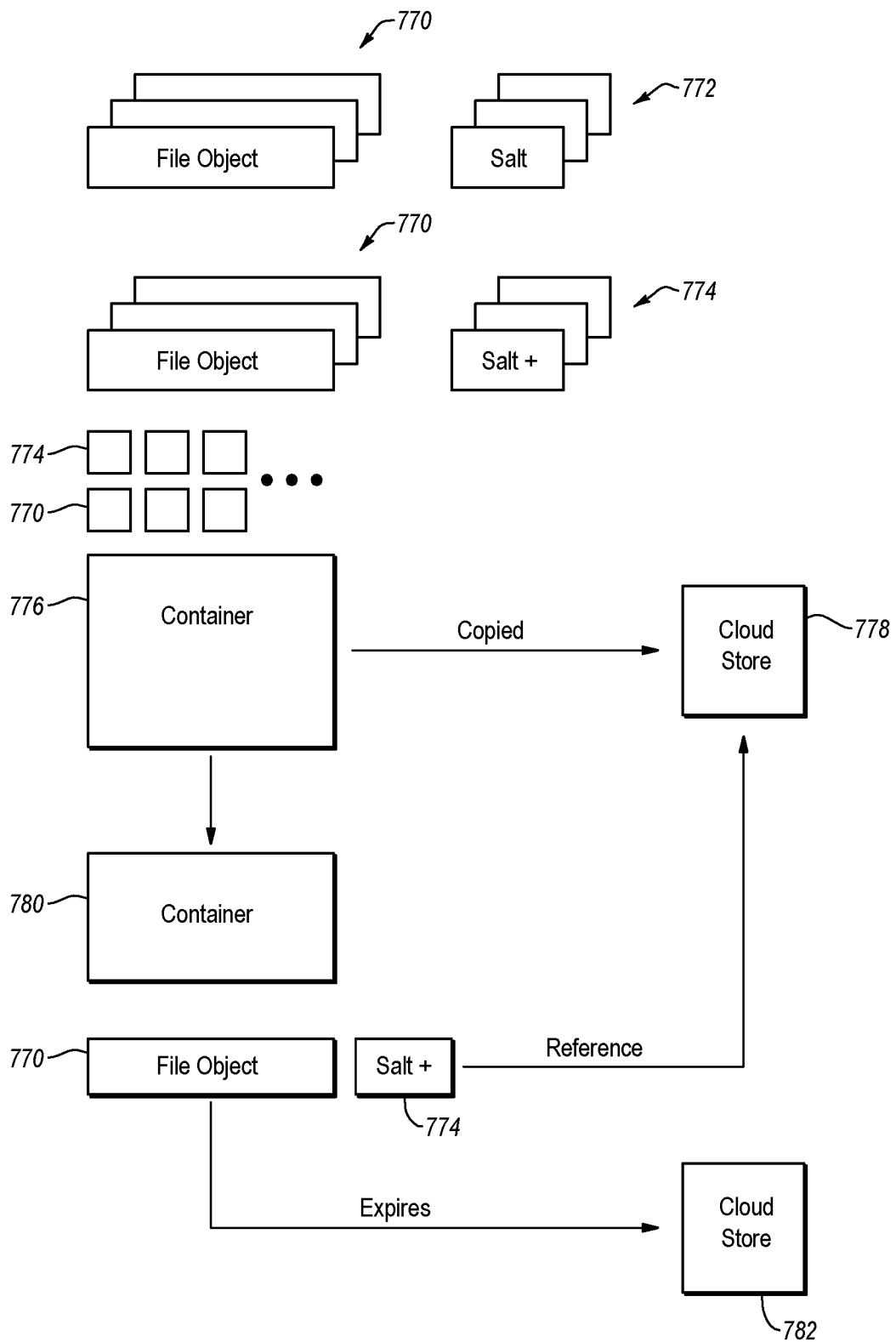
FIG. 6 discloses aspects of a process and configuration for salting data on one or more bases in addition to, or instead of, a user basis.

With the foregoing discussion in view, attention is directed now to FIG. 6. As disclosed there, instead of salting content on a user basis, or in addition in addition to salting content on a user basis, salting can be defined on a set of objects 770 that share a common property, or which share multiple common properties. Such properties can include, but are not limited to, an expiration period, object type, object age, object size, or any other metadata concerning an object or group of objects.

In the example of FIG. 6, the objects 770 are salted with a user salt 772, as disclosed elsewhere herein. Additionally, this particular example involves deduplicated backups that are targeted for tiering to the cloud, the deduplicated backups are part of the same data set and have the same retention period. Thus, the commonality of retention period can be reflected by the use of an additional salt that is applied to all the data/backups in the data set that have the same retention period. The additional salt can be applied even if the data sets sharing the same retention period, and/or other common characteristic(s), are associated with different respective users. In at least some embodiments, the additional salt is appended to the user salt 772 to form a 'user salt+monthly retention salt' 774. The appending of the additional salt to the user salt 772 can be performed before, or after, the user salt 722 is associated with the file object(s) 770. As disclosed elsewhere herein, the combination of the salts 774 and file object(s) 770 can then be hashed and the new chunks from the hashing process then deposited in a container 776 which can then be copied by a deduplication server and/or application to a cloud store 778, such as by way of a translation layer for example.

As the new chunks are copied to the cloud store 778, they can be marked dead so that they can be removed from local storage and that space can be reclaimed by a garbage collection process, which may be performed by the deduplication system. In particular, and with reference to FIG. 6, the local version of the copied chunks can be dumped to a local container 780. At or about the same time, references to the copied chunks in the cloud store can be maintained at the local deduplication system using a data structure representation so that the chunks in the cloud store can be later recalled in the event of an access request from a user concerning the namespace object that represents those chunks.

Finally, the file object 770 that has been salted with salt 774 will expire according to the conditions of that salt. At that time, the file object 770 will be removed from the cloud store and deposited in a cloud store 782 for deleted items.

As will be apparent from the discussion of FIG. 6, and the other disclosure herein, similar methods to fine-grained recall can be used if, retrospectively, the retention of an object stored within the deduplication domain is changed such that it needs to be preserved for a longer period of time. In this situation, the specific objects can be recalled from the salted deduplication domain in the cloud and re-written into a newly salted deduplication domain thus creating a subsequent salted deduplication domain ready for tiering to the cloud. As noted above, a data structure representation of the objects can be used to facilitate such a recall process.

In addition to those noted above, yet other benefits attend the tiering of salted content to cloud storage. For example, another benefit of content salting for tiering deduplication domains to the cloud is the ability to consume cloud storage using primitive object interfaces such as S3. As well, with sufficient metadata to describe the structure of the salted deduplication domain and the objects it represents in the cloud, it is possible to use range offset instructions provided by the cloud store to recall and reconstruct individual objects, such as a file or backup for example, contained within the salted deduplication domain.

H. Salted Data Scrubbing in a Cloud Store

Figure 7:
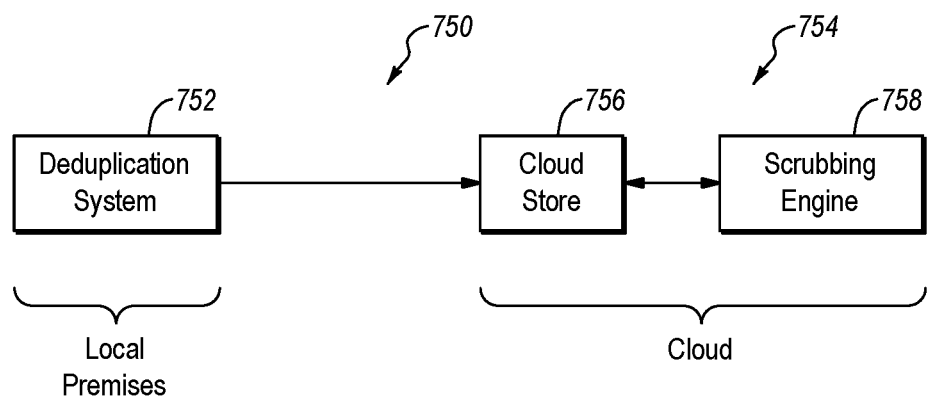
FIG. 7 discloses aspects of a process and configuration for scrubbing data chunks in a cloud store that includes one or more salted deduplication domains

With attention now to FIG. 7, details are provided concerning an arrangement and process for scrubbing data chunks in a cloud store that includes one or more salted deduplication domains. In general, scrubbing refers to any processes for detecting and removing, or correcting, any stored information that has an error or problem. With respect to tiered salted deduplication domains that reside in cloud storage, it may be time and/or cost prohibitive for a user to recall the stored data, scrub the recalled data, and then return the cleaned up data store to the cloud. Thus, it would be useful to be able to scrub the stored data at the cloud and thereby avoid the need for data recall processes.

Accordingly, embodiments of the invention may employ a cloud store scrubbing engine (such as cloud store scrubbing engine 402—see FIG. 1) to perform out-of-band data scrubbing. As such, the scrubbing function can be localized to a compute instance located in, or otherwise associated with, the same cloud computing environment that supports the cloud store where the salted deduplication domain(s) is/are located. In some embodiments, the compute instance can take the form of a virtual machine (VM), although that is not necessarily required. The compute instance can be dedicated to the scrubbing function. As well, the compute instance can be employed on an as-needed or on-demand basis, remaining offline until a scrubbing process for a salted deduplication domain is requested.

With particular reference now to FIG. 7, a scrubbing configuration 750 may embrace a deduplication system 752 (or, for example, a deduplication environment 350—FIG. 1) that resides at a local premises, such as a user location for example. The deduplication system 752 is configured to communicate with a cloud computing environment 754 that includes, among other things, a cloud store 756 and a scrubbing engine 758.

In operation, a backup can be performed by, or at the direction of, the deduplication system 752 and the backup copy transmitted to the cloud store 756 for storage and later restoration, if required. Scrubbing of the data in the cloud store 756, such as one or more salted deduplication domains for example, can be performed by the scrubbing engine 758. The scrubbing process can be initiated ad hoc by a user at the local premises, and/or can be performed according to a particular time schedule, and/or on any other basis. As well, the scrubbing engine 758 can prepare and send to the local premises a report of the actions performed in connection with one or more salted deduplication domains located at the cloud store 756.

I. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A non-transitory storage medium having stored therein instructions that are executable by one or more hardware processors to perform operations comprising:
 receiving, at a cloud storage site, chunks that each take the form of a hash of a combination that comprises a plurality of salts and a file object, and one of the salts is a retention salt shared by the chunks, and another of the salts is a user-specific salt;
 monitoring a time period associated with the retention salt;
 when the time period has expired, removing the chunks that include the retention salt;
 depositing the removed chunks in a deleted items cloud store;
 keeping a running total of chunk sizes with which the user-specific salt is associated, and the running total accounts for both ingestion of data chunks and the removed chunks; and
 based on the running total, determining an amount of backend storage capacity consumed by objects associated with the user.

2. The non-transitory storage medium as recited in claim 1, wherein receiving the chunks comprises receiving an object that includes the chunks, and removing and depositing the chunks comprises removing the object and depositing the object in the deleted items cloud store.

3. The non-transitory storage medium as recited in claim 1, wherein all the chunks are received from a common container of a local premises site that is remote from the cloud storage site.

4. The non-transitory storage medium as recited in claim 1, wherein removing and depositing the chunks is performed without the use of a copy-forward garbage collection process.

5. The non-transitory storage medium as recited in claim 1, wherein the chunks are received from a deduplication system.

6. The non-transitory storage medium as recited in claim 1, wherein the chunks are received at the cloud storage site as part of a tiering process in which the chunks are stored at the cloud storage site according to a particular priority of the chunks relative to other chunks that are, or will be, stored at the cloud storage site.

7. The non-transitory storage medium as recited in claim 1, wherein the chunks are stored in a content salted deduplication domain at the cloud storage site.

8. The non-transitory storage medium as recited in claim 1, wherein when received at the cloud storage site, the chunks are contained in a container and are then stored in an object store of the cloud storage site.

9. The non-transitory storage medium as recited in claim 1, wherein the operations further comprise scrubbing chunks stored at the cloud storage site.

10. A system, comprising:
 one or more hardware processors; and
 a non-transitory storage medium having stored therein instructions that are executable by the one or more hardware processors to perform operations comprising:
  receiving, at a cloud storage site, chunks that each take the form of a hash of a combination that comprises a plurality of salts and a file object, and one of the salts is a retention salt shared by the chunks, and another of the salts is a user-specific salt;
  monitoring a time period associated with the retention salt;
  when the time period has expired, removing the chunks that include the retention salt;
  depositing the removed chunks in a deleted items cloud store;
  keeping a running total of chunk sizes with which the user-specific salt is associated, and the running total accounts for both ingestion of data chunks and the removed chunks; and
  based on the running total, determining an amount of backend storage capacity consumed by objects associated with the user.

11. The system as recited in claim 10, wherein receiving the chunks comprises receiving an object that includes the chunks, and removing and depositing the chunks comprises removing the object and depositing the object in the deleted items cloud store.

12. The system as recited in claim 10, wherein all the chunks are received from a common container of a local premises site that is remote from the cloud storage site.

13. The system as recited in claim 10, wherein removing and depositing the chunks is performed without the use of a copy-forward garbage collection process.

14. The system as recited in claim 10, wherein the chunks are received from a deduplication system.

15. The system as recited in claim 10, wherein the chunks are received at the cloud storage site as part of a tiering process in which the chunks are stored at the cloud storage site according to a particular priority of the chunks relative to other chunks that are, or will be, stored at the cloud storage site.

16. The system as recited in claim 10, wherein the chunks are stored in a content salted deduplication domain at the cloud storage site.

17. The system as recited in claim 10, wherein when received at the cloud storage site, the chunks are contained in a container and are then stored in an object store of the cloud storage site.

18. The system as recited in claim 10, wherein the operations further comprise scrubbing chunks stored at the cloud storage site.

* * * * *